United States Patent
Hata et al.

(10) Patent No.: US 6,780,343 B2
(45) Date of Patent: Aug. 24, 2004

(54) STABLY DISPERSED MAGNETIC VISCOUS FLUID

(75) Inventors: Katsuhiko Hata, Kobe (JP); Nozomi Kiga, Kobe (JP); Seiichi Miyanaga, Wakayama (JP)

(73) Assignees: Bando Chemical Industries Ltd., Hyogo (JP); Kao Corporation, Tokyo (JP)

( * ) Notice: Subject to any disclaimer, the term of this patent is extended or adjusted under 35 U.S.C. 154(b) by 0 days.

(21) Appl. No.: 10/089,495

(22) PCT Filed: Jul. 31, 2001

(86) PCT No.: PCT/JP01/06574

§ 371 (c)(1),
(2), (4) Date: May 1, 2002

(87) PCT Pub. No.: WO02/10281

PCT Pub. Date: Feb. 7, 2002

(65) Prior Publication Data

US 2003/0006395 A1 Jan. 9, 2003

(30) Foreign Application Priority Data

Jul. 31, 2000 (JP) ........................................ 2000-231263

(51) Int. Cl.[7] .................................................. H01F 1/44
(52) U.S. Cl. ....................................................... 252/62.52
(58) Field of Search ....................................... 252/62.52

(56) References Cited

U.S. PATENT DOCUMENTS 4,956,113 A    9/1990  Kanno et al.
5,645,752 A    7/1997  Weiss et al.
6,413,441 B1 * 7/2002  Levin ...................... 252/62.52

FOREIGN PATENT DOCUMENTS

| JP | 2-1424 A    | 1/1990  |
| JP | 6-135889    | 5/1994  |
| JP | 10-172381   | 6/1998  |
| JP | 11-273930   | 10/1999 |

* cited by examiner

Primary Examiner—C. Melissa Koslow
(74) Attorney, Agent, or Firm—Jordan and Hamburg LLP

(57) ABSTRACT

The present invention is directed to a stabilized dispersion magnetorheological fluid comprising a magnetic particle, a dispersive medium and a dispersing agent wherein said dispersing agent is a polyether containing a polymer unit represented by the following general formula (1):

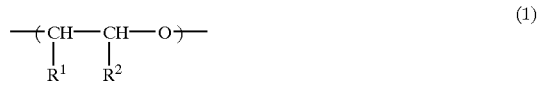

(1)

in the formula, $R^1$ represents a hydrogen atom or a hydrocarbon group of 1 to 22 carbon atoms; $R^2$ represents a hydrogen atom, a hydrocarbon group of 1 to 22 carbon atoms which may optionally have a substituent, or —(AO)m-$R^3$; $R^3$ represents a hydrocarbon group of 1 to 22 carbon atoms which may optionally have a substituent; A represents an alkylene group of 1 to 3 carbon atoms; m represents an integer of 1 to 50; and A groups which number m may be the same or different.

4 Claims, 2 Drawing Sheets

STABLY DISPERSED MAGNETIC VISCOUS FLUID

TECHNICAL FIELD

The present invention relates to a stabilized dispersion magnetorheological fluid having a good dispersion stability and recovery of magnetorheological characteristic, both of which are sustained over a protracted period of time.

BACKGROUND ART

Liquid compositions which undergo changes in rheological characteristics in response to a magnetic field, which are generally called magnetorheological fluids, magnetic fluids, or magnetorheological materials, are already known. For example, an early description of magnetic field-responsive magnetic material-containing liquid compositions can be found in AIEE Transactions, "Characteristics of Magnetic Fluids" (published February, 1955), the paper 55-170 authored by J. D. Coolidge Jr. & R. W. Harberg (pp. 149–152). A magnetorheological fluid comprising iron oleate as a dispersing agent is disclosed in U.S. Pat. No. 2,661,596, and several relevant technologies are also disclosed in U.S. Pat. No. 3,006,656, U.S. Pat. No. 4,604,229, Japanese Kokai Publication Sho-51-13995, Japanese Kokai Publication Sho-51-44579 and so forth. These are invariably concerned with disperse systems such that magnetic particles (mean particle diameters: a few nm to tens of μm) contained are oriented by externally applied magnetic fields to form chain-like clusters and accordingly gain in viscosity or form gels and, hence, show marked changes in rheological characteristics and yield stress.

The hitherto-proposed field of application of such magnetorheological fluids or magnetic fluids includes bearings, seal materials, centering devices, loudspeakers, clutches, brakes, dampers, shock absorbers, engine mounts, elevator functional members, and aseismatic structures for buildings.

However, none of these fluids have been commercially implemented for applications requiring comparatively large changes in rheological characteristics and yield stress, such as clutches, brakes, dampers, shock absorbers, and aseismatic structures for buildings.

In order that a magnetorheological fluid may express such characteristics as mentioned above, it is necessary that magnetic particles have been uniformly dispersed in a dispersive medium. However, since the true density of magnetic particles is considerably higher than that of the dispersive medium, it has been difficult to impart good dispersion stability to magnetorheological fluids. It is generally effective to increase the viscosity of the dispersive medium in order to improve the dispersion stability of a magnetorheological fluid but excessively increasing the viscosity of the dispersive medium leads to an increased viscosity of the magnetorheological fluid itself, thus giving rise to the problem that the magnetorheological fluid obtained is difficult to handle.

SUMMARY OF THE INVENTION

In the above state of the art, the present invention has for its object to provide a stabilized dispersion magnetorheological fluid which harbors magnetic particles of high specific gravity dispersed uniformly without aggregation or precipitation/agglomeration over a protracted period of time and can permanently keep good dispersion stability and recovery of magnetorheological characteristics.

The present invention is directed to a stabilized dispersion magnetorheological fluid comprising a magnetic particle, a dispersive medium and a dispersing agent wherein said dispersing agent is a polyether containing a polymer unit (hereinafter referred to sometimes as polymer unit (1)) represented by the following general formula (1):

in the formula, $R^1$ represents a hydrogen atom or a hydrocarbon group of 1 to 22 carbon atoms; $R^2$ represents a hydrogen atom, a hydrocarbon group of 1 to 22 carbon atoms which may optionally have a substituent, or —(AO)m-$R^3$; $R^3$ represents a hydrocarbon group of 1 to 22 carbon atoms which may optionally have a substituent; A represents an alkylene group of 1 to 3 carbon atoms; m represents an integer of 1 to 50; and A groups which number m may be the same or different. The dispersive medium for use in the present invention is preferably a hydrocarbon oil.

Figure 1:
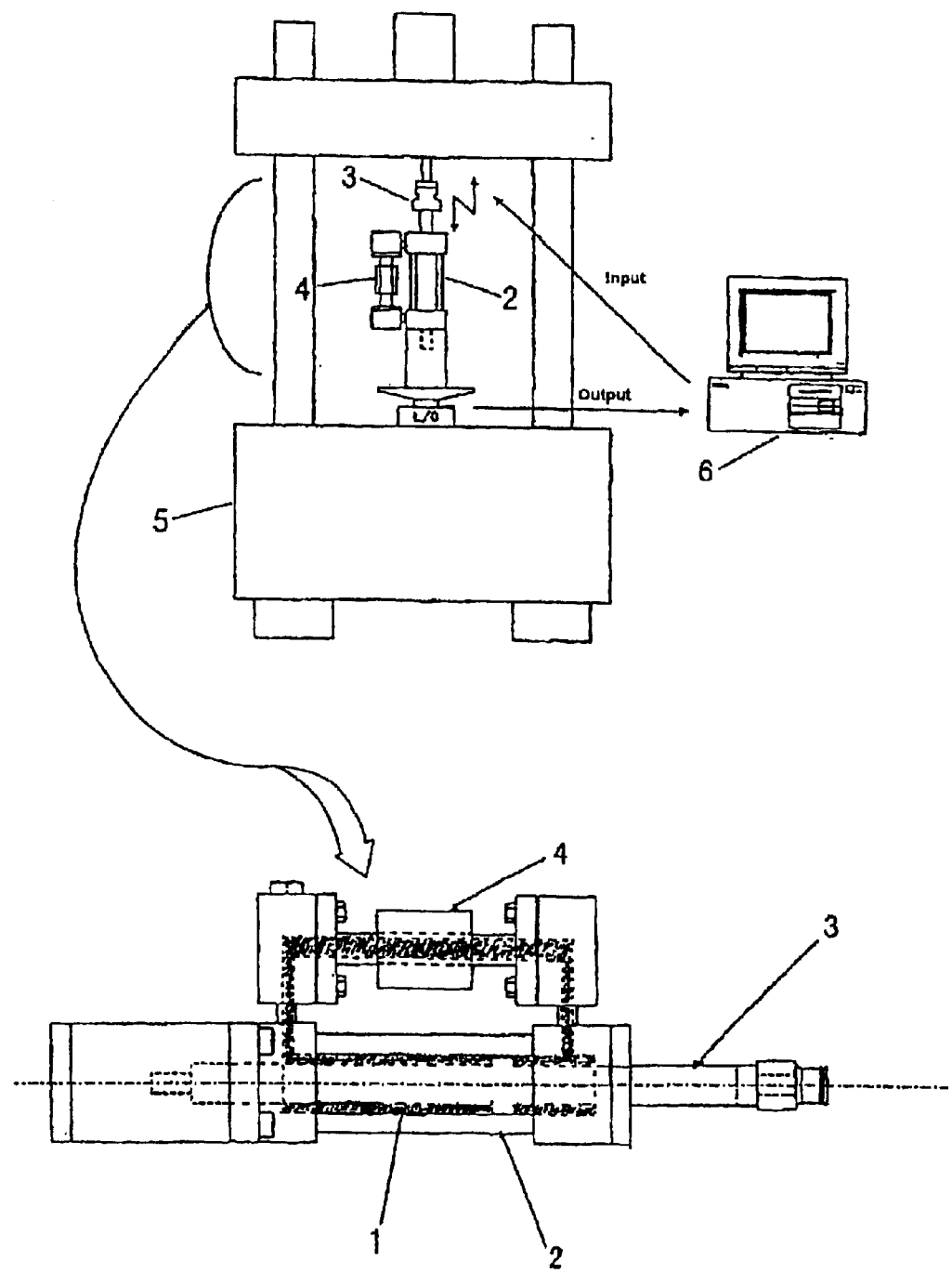
FIG. 1 is a schematic diagram showing the system for the magnetorheological characteristic measurement used in Examples.

In the figures, 1 denotes a magnetorheological fluid, 2 is a cylinder, 3 is a piston, 4 is an electromagnet, 5 is a hydraulic servo tester, 6 is a personal computer for control and measurement, 7 is an amplitude-load loop, 8 is an amplitude-load loop at 0 magnetic field, and 9 is an amplitude-load loop at a 900-gauss magnetic field.

DETAILED DESCRIPTION OF THE INVENTION

The present invention is now described in detail.

The stabilized dispersion magnetorheological fluid of the invention comprises a magnetic particle, a dispersive medium and a dispersing agent.

The magnetic particle mentioned above is not particularly restricted provided that it has magnetism, thus including particles of iron, iron nitride, iron carbide, carbonyl-iron, chromium dioxide, low-carbon steel, nickel, cobalt, and iron alloys such as aluminum-containing iron alloy, silicon-containing iron alloy, cobalt-containing iron alloy, nickel-containing iron alloy, vanadium-containing iron alloy, molybdenum-containing iron alloy, chromium-containing iron alloy, tungsten-containing iron alloy, manganese-containing iron alloy, and copper-containing iron alloy, etc. Preferred among these is carbonyl-iron which expresses a large stress even in response to a slight magnetic field.

These magnetic particles may be used each independently or in a combination of two or more species.

The particle diameter of the above magnetic particles is preferably 0.01 to 100 μm. If the particle diameter is less than 0.01 μm, it will be difficult to gain the viscosity significantly on application of a magnetic field because of a low viscosity. If it exceeds 100 μm, the magnetic particles tend to precipitate in the dispersive medium, thus affecting the dispersion stability. The more preferred range is 0.5 to 20 μm.

The magnetic particles for use in the present invention may be surface-coated with a silane coupling agent, an insulating material, or the like insofar as the magnetic properties and dispersion stability will not be remarkably affected.

The dispersive medium mentioned above is not particularly restricted but from the standpoint of long-term stability, a low-vapor-pressure oil is preferred. Thus, for example, there can be mentioned hydrocarbon oils such as white oil (liquid paraffin), mineral oil, spindle oil, higher alkylbenzene, higher alkyl-naphthalene, polybutene, poly-α-olefin oil, etc.; phenyl ethers such as alkyl diphenyl ethers, dialkyl tetraphenyl ethers, alkyl triphenyl ethers, etc.; dicarboxylic acid diesters such as dioctyl phthalate, dioctyl azelate, dioctyl adipate, dioctyl sebacate, dibutyl phthalate, dihexyl maleate, etc.; polyol polyesters obtainable from polyols and carboxylic acids, such as trimethylolpropane tri-n-heptyl ester, pentaerythritol tetra-n-hexyl ester, pentaerythritol tetra-2-ethylhexyl ester; phosphoric acid triesters such as tributyl phosphate, tri-2-ethylhexyl phosphate, tricresyl phosphate, trixylyl phosphate, triaryl phosphate, etc.; and silicone oils such as dimethyl silicone oils, methyl hydrogen polysiloxanes, methylphenyl silicone oils, α-methylstyrene-modified silicone oils, alkyl-modified silicone oils, alcohol-modified silicone oils, amino-modified silicone oils, polyether-modified silicone oils, chlorinated silicone oils, fluorinated silicone oils, and so forth. Among these, hydrocarbon oils are suitably used.

These dispersive media may be used each independently or in a combination of two or more species.

The dispersing agent for use in the invention is a polyether containing the above-mentioned polymer unit (1).

Referring to the above general formula (1), $R^1$ is a hydrogen atom or a hydrocarbon group of 1 to 22 carbon atoms, preferred examples of the above hydrocarbon group of 1 to 22 carbon atoms includes alkyl groups of 1 to 18 carbon atoms, aryl groups of 6 to 14 carbon atoms, and arylalkyl or alkylaryl groups of 7 to 22 carbon atoms. As the more preferred species, methyl, ethyl, n-butyl, octyl, dodecyl and like groups can be mentioned.

Referring to the above general formula (1), $R^2$ is a hydrogen atom, a hydrocarbon group of 1 to 22 carbon atoms which may optionally have a substituent, or —(AO)m-$R^3$.

As preferred examples of the above hydrocarbon group of 1 to 22 carbon atoms, there can be mentioned, for example, alkyl groups of 1 to 18 carbon atoms, aryl groups of 6 to 14 carbon atoms, and arylalkyl or alkylaryl groups of 7 to 22 carbon atoms. The more preferred are methyl, ethyl, n-butyl, octyl, decyl, cetyl, and like groups. The above-mentioned hydrocarbon group of 1 to 22 carbon atoms may have a substituent or substituents, and as such substituents, there can be mentioned, for example, halogen atoms, such as chlorine, bromine, etc.; and hydroxyl, amino, dimethylamino, diethylamino, amido of 1 to 18 carbon atoms, acyl of 1 to 18 carbon atoms, methyl ester, ethyl ester, carboxyl and like groups.

Referring to said —(AO)m-$R^3$, $R^3$ is a hydrocarbon group of 1 to 22 carbon atoms which may optionally have a substituent, A is an alkylene group of 1 to 3 carbon atoms, m is an integer of 1 to 50, and A groups which number m may be the same or different.

As preferred examples of the above $R^3$, there can be mentioned, for example, alkyl groups such as methyl, ethyl, i-propyl, n-butyl, t-butyl, hexyl, octyl, 2-ethylhexyl, decyl, cetyl, stearyl and like groups; aryl groups such as phenyl, naphthyl and like groups; and arylalkyl or alkylaryl groups such as phenethyl, nonylphenyl, butylphenyl and like groups. Preferred among these are ethyl, n-butyl, t-butyl, octyl, 2-ethylhexyl, decyl, cetyl, stearyl, phenyl, and phenethyl groups.

The above $R^3$ may optionally have a substituent or substituents and as the above substituents, those mentioned hereinbefore can be mentioned.

The above A may for example be methylene, ethylene, or propylene group. In the above —(AO)m-$R^3$, A groups which number m may be the same or different.

The above m represents an integer of 1 to 20, more preferably an integer of 1 or 5 to 10.

The preferred combination of the above A and m is that A is a methylene group and m is 1.

In the polyether for use in the invention, the groups represented by $R^1$ and $R^2$, respectively, may be groups of a plurality of kinds and, in such cases, the mode of arrangement of polymer units having such groups in the backbone chain of the polyether may be any of block, alternating, periodic, and statistical (including random) modes.

The polyether for use in the invention may be a homopolymer of said polymer unit (1) or a copolymer with another polymer unit. In the latter case, the mode of arrangement of the polymer unit (1) and another polymer unit (which may be a plurality of kinds) may be any of block, alternating, periodic, statistical (including random) and graft modes.

The alternating, periodic, and statistical (including random) copolymers containing said polymer unit (1) can be obtained by anionic or cationic copolymerization. As another polymer unit, preferred include polymer units derived from substituted epoxides other than said polymer unit (1), and polymer units derived from oxetane, (meth) acrylic esters, styrene, butadiene, isoprene, lactones, carbon dioxide, lactams, and derivatives thereof.

In the case where the polyether for use in the invention is a block or graft copolymer, the chain segment not containing the polymer unit (1) but being composed of another polymer unit may be a chain obtainable by any polymerization method, such as anionic polymerization, cationic polymerization, radical polymerization, or polycondensation. As preferred examples of such polymer chain segment, there can be mentioned poly[(meth)acrylate], polystyrene, polybutadiene, polyisoprene, amorphous polypropylene, polyallylamine, polyethyleneimine, epoxy resin, and derivatives thereof.

In the case where said polyether is a copolymer, the molar fraction of the polymer unit (1) in the copolymer is preferably not less than 0.1 to less than 1.0, more preferably not less than 0.3 to less than 1.0, still more preferably not less than 0.5 to less than 1.0.

The terminal group of said polyether is not particularly restricted but in cases where terminal groups can be controlled according to the synthetic method, a hydrogen atom, halogen, and hydroxyl, alkyl or alkoxyl of 1 to 22 carbon atoms, amino, dimethylamino, diethylamino, amido of 1 to 18 carbon atoms, acyl of 1 to 18 carbon atoms, methyl ester, ethyl ester, and carboxyl groups are preferred.

The molecular weight of said polyether is preferably 1,000 to 200,000,000, more preferably 10,000 to 100,000,000, still more preferably 30,000 to 50,000,000.

The polyether for use in the present invention can be obtained by the process described in WO99/42513, for instance. These various species of polyether can be used each independently or in a combination of two or more species.

The content of said polyether is preferably 0.1 to 20 weight parts relative to 100 weight parts of said dispersive medium. If it is less than 0.1 weight part, a sufficient dispersion stability may not be imparted to the resulting magnetorheological fluid. If it exceeds 20 weight parts, the above polyether will occur as foreign matter in the dispersive medium and tends to interfere with the rheology of the magnetorheological fluid.

The preferred formulating amount of said magnetic particle is preferably 10 to 90 weight % relative to the total of the stabilized dispersion magnetorheological fluid of the invention. If it is less than 10 weight %, the viscosity gain of the resulting magnetorheological fluid on application of a magnetic field will be small. If it exceeds 90 weight %, the rheology of the resulting magnetorheological fluid may possibly decrease. The more preferred range is 50 to 80 weight %.

The stabilized dispersion magnetorheological fluid of the invention is a uniform dispersion of magnetic particles in a dispersive medium using said polyether as a dispersing agent.

The method of dispersing magnetic particles in a dispersive medium in accordance with the invention may comprise, for example, dissolving said polyether in a dispersive medium in advance, blending magnetic particles thereto, and mixing the whole using a dispersing machine such as a homogenizer, ball mill, sand mill, three-roll mill, or the like or alternatively coating surfaces of magnetic particles with said polyether in advance, adding the coated particles to a dispersive medium, and mixing the whole using a dispersing machine such as a homogenizer, ball mill, sand mill, three-roll mill, or the like.

The method of dissolving said polyether in a dispersive medium is not particularly restricted but includes, for example, the method which comprises adding said polyether to the dispersive medium heated to 70° C. and stirring the mixture for one hour.

Where necessary, the stabilized dispersion magnetorheological fluid according to the invention may be supplemented with other dispersing agents in addition to said polyether.

As examples of said other dispersing agents, there may be mentioned perfluoroethercarboxylic acid salts, perfluorocarboxamides, fatty acids such as oleic acid, stearic acid, palmitic acid, lauric acid, linoleic acid, linolenic acid, erucic acid, myristic acid, etc.; salts of fatty acids, such as sodium oleate, potassium oleate, ammonium oleate, sodium stearate, sodium palmitate, potassium laurate, sodium erucate, sodium myristate, potassium myristate, sodium behenate, etc.; sorbitan esters such as polyoxyethylene sorbitan esters; dialkoxy sulfone succinate, polyoxyethylene alkylallyl ethers, polyoxyethylene alkyl esters, alcohol sulfate esters, alkylbenzenesulfonic acids, phosphoric acid salts, polyoxyethylenealkylamines, glycerol esters, aminoalcohol esters, silane coupling agents, ethyleneimines, amino group-containing compounds such as aminosilane coupling agents etc.; and compounds represented by the following formula (2):

$$C_aH_{2a+1}-Y-SiR_{3-b}L_b \quad (2)$$

in the formula, Y represents $(CH_2)_k$ or $C_6H_4CH_2CH_2$; k represents an integer of 1 to 4; R represents an alkyl group, such as methyl, ethyl, propyl, or butyl group; L represents a halogen atom; a hydroxy group; an alkoxyl group, such as methoxyl, ethoxyl, propoxyl, or butoxyl group; or an acyloxyl group such as formyl, acetoxyl, propionyloxyl, or butyryloxyl group; a represents an integer of 1 to 20; and b represents an integer of 1 to 3.

Unless its magnetorheological characteristics are not materially affected, the stabilized dispersion magnetorheological fluid according to the invention may further be supplemented with additives such as an antioxidant, aging inhibitor or the like stabilizer, an antiseptic, a viscosity modifier, a flame retardant, a surfactant, and so forth.

BEST MODE FOR CARRYING OUT THE INVENTION

The following Examples illustrate the present invention in further detail without defining the scope of the invention.

EXAMPLES 1 AND 2

According to the formulating amounts shown in Table 1, a polyether (A) (Mn; $36 \times 10^4$) represented by the following formula (3) was added to a dispersive medium (dioctyl phthalate or polybutene) preheated at 70° C. and dissolved by stirring for 1 hour. Then, magnetic particles were further blended therein. A pot having an inside diameter of 90 mm and a capacity of 900 mL was charged with a 200 mL portion of the resulting mixture and further with 2,000 g of ½-inch steel balls. Spinning on a ball mill stand at 100 rpm for 24 hours gave a magnetorheological fluid. The Mn value given above is the number average molecular weight (on a polystyrene basis) as determined by GPC analysis (measuring temperature 130° C., solvent: o-dichlorobenzene). Waters' type GPC150C was used for the determination, and Showa Denko's Shodex HT-806 and Shodex HT-803 (×2 columns) were used as columns.

(3)

COMPARATIVE EXAMPLE 1

According to the formulating amount shown in Table 1, stearic acid was added to polybutene preheated to 70° C. and dissolved by stirring for 1 hour. Then, magnetic particles were further blended therein. A pot having an inside diameter of 90 mm and a capacity of 900 mL was charged with a 200 mL portion of the resulting mixture and further with 2,000 g of ½-inch steel balls. Spinning on a ball mill stand at 100 rpm for 24 hours gave a magnetorheological fluid.

COMPARATIVE EXAMPLE 2

According to the formulating amount shown in Table 1, stearic acid was dissolved in toluene and magnetic particles were immersed in a predetermined quantity of the solution. The toluene was then evaporated off and the residue was preliminarily blended with polydimethylsiloxane. A pot having an inside diameter of 90 mm and a capacity of 900 mL was charged with a 200 mL portion of the resulting mixture and further with 2,000 g of ½-inch steel balls. Spinning on a ball mill stand at 100 rpm for 24 hours gave a magnetorheological fluid.

The magnetorheological fluids obtained were evaluated for the following parameters. The results are shown in Table 1.

(1) Initial Magnetorheological Characteristic

Figure 2:
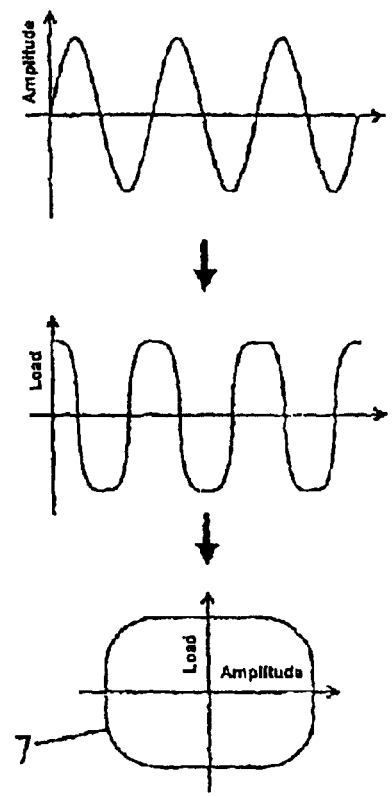
FIG. 2 is a diagram showing an example of the magnetorheological characteristic measurement.
Figure 2:
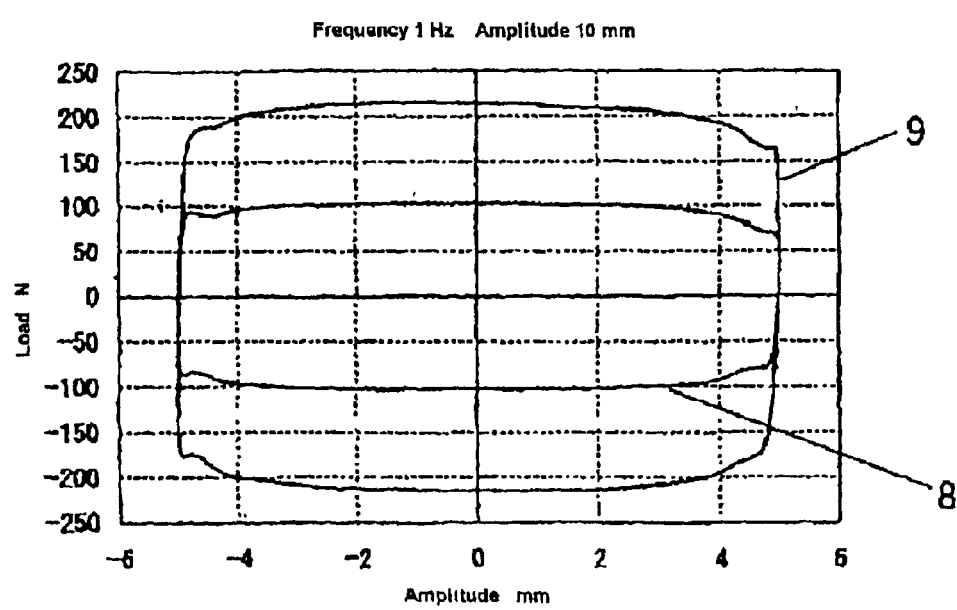

The cylinder illustrated in FIG. 1 was filled with each magnetorheological fluid immediately after preparation and the amplitude-load characteristic was measured using magnetic fields of 0 and 900 gausses, a frequency of 1 Hz, and an amplitude of 10 mm. An example of this measurement is shown in FIG. 2.

First, the load at a 0 magnetic field was read, and, then, from the ratio of the amplitude-load loop area at a 900-gauss magnetic field relative to the amplitude-load loop area at a 0 magnetic field, the percent gain of the loss energy at a 900-gauss magnetic field relative to that of at a 0 magnetic field was calculated. Except for the magnetorheological fluid according to Comparative Example 2, the loss energy became steady invariably in the 3rd cycle and, therefore, the amplitude-load loop in the 3rd cycle was used in the determination of loss energy. The magnetorheological fluid according to Comparative Example 2 was poor in rheology and since the load at a 0 magnetic field was above the measurement limit, the magnetorheological characteristic could not be determined.

(2) Recovery of Magnetorheological Characteristic

Each magnetorheological fluid which had undergone a measurement of initial magnetorheological characteristic was allowed to stand, as it was filled in the cylinder, at 25° C. for 3 months. Then, it was further left standing at room temperature for 24 hours. Then, the amplitude-load loop was measured at a 0 magnetic field and the number of cycles required until the loss energy value immediately after preparation as found by the above initial magnetorheological characteristic measurement (1) had been reached was measured. Thereafter, a 900-gauss magnetic field was applied immediately and the loss energy in the 3rd cycle was measured to calculate the percent gain in loss energy.

(3) Dispersion Stability (25° C.)

The magnetorheological fluid immediately after preparation, 25 mL, was placed in a measuring cylinder and allowed to stand at 25° C. for 3 months. After the 3-month period, the volume of the supernatant layer was measured.

(4) Dispersion Stability (50° C.)

The magnetorheological fluid immediately after preparation, 25 mL, was placed in a measuring cylinder and allowed to stand at 50° C. for 3 months. After the 3-month period, the volume of the supernatant layer was measured.

TABLE 1

|  |  | Example | | Compar. Ex. | |
|---|---|---|---|---|---|
|  |  | 1 | 2 | 1 | 2 |
| Formulation | | | | | |
| Magnetic particles | | 75 | 75 | 75 | 75 |
| Polyether (A) | | 5 | 5 | — | — |
| Stearic acid | | — | — | 5 | 5 |
| Dioctyl phthalate | | 25 | — | — | — |
| Polybutene | | — | 25 | 25 | — |
| Polydimethylsiloxane | | — | — | — | 25 |
| Evaluation | | | | | |
| Initial magnetorheological characteristic | | 225 | 220 | 215 | Not measurable |
| Recovery of characteristic | Number of cycles | 5 | 3 | 63 | Not measurable |
|  | Percent gain in loss energy | 205 | 210 | 190 | Not measurable |
| Dispersion stability | 25° C. | 6.9 | 4.3 | 13.2 | 5.8 |
|  | 50° C. | — | 4.7 | — | 9.6 |

The compounds listed in Table 1 are as follows.

Magnetic particles; product of BASF, carbonyl-iron powder CM

Stearic acid; product of Wako Pure Chemical, reagent special grade

Dioctyl phthalate; product of Sanken Kako, viscosity 80 cP (20° C.)

Polybutene; product of Nippon Oil and Fats, Polyvis ON, viscosity 85 cP (20° C.)

Polydimethylsiloxane; product of Japan Unicar, L-45 (10,000), viscosity 10,000 cP (25° C.)

INDUSTRIAL APPLICABILITY

In accordance with the present invention constituted as above, there can be provided a stabilized dispersion magnetorheological fluid having a good dispersion stability and good recovery of magnetorheological characteristic, maintaining a stable magnetorheological characteristic despite changes in temperature and other environmental factors, and expressing a good magnetorheological characteristic over a protracted period of time.

What is claimed is:

1. A stabilized dispersion magnetorheological fluid comprising a magnetic particle, a dispersive medium and a dispersing agent wherein said dispersing agent is a polyether containing a polymer unit represented by the following general formula (1):

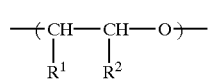

(1)

in the formula, $R^1$ represents a hydrogen atom or a hydrocarbon group of 1 to 22 carbon atoms; $R^2$ represents $-(AO)m-R^3$; $R^3$ represents a hydrocarbon group of 1 to 22 carbon atoms which may optionally have a substituent; A represents an alkylene group of 1 to 3 carbon atoms; m represents an integer of 1 to 50; and A groups which number m may be the same or different.

2. The stabilized dispersion magnetorheological fluid according to claim 1 wherein the dispersive medium is a hydrocarbon oil.

3. A stabilized dispersion magnetorheological fluid comprising a magnetic particle, a dispersive medium and a dispersing agent wherein said dispersing agent is a polyether containing a polymer unit represented by the following general formula (1):

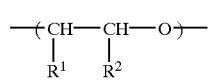

(1)

in the formula, $R^1$ represents a hydrogen atom or a hydrocarbon group of 1 to 22 carbon atoms; when $R^1$ represents a hydrogen atom, $R^2$ represents a hydrocarbon group of 1 to 22 carbon atoms which may optionally have a substituent, or $-(AO)m-R^3$; $R^3$ represents hydrocarbon group of 1 to 22 carbon atoms which may optionally have a substituent; A represents an alkylene group of 1 to 3 carbon atoms; m represents an integer of 1 to 50; and A groups which number m may be the same or different, and when $R^1$ represents a hydrocarbon group of 1 to 22 carbon atoms, $R^2$ represents a hydrogen atom, a hydrocarbon group of 1 to 22 carbon atoms which may optionally have a substituent, or —(AO)m-$R^3$; $R^3$ represents a hydrocarbon group of 1 to 22 carbon atoms which may optionally have a substituent; A represents an alkylene group of 1 to 3 carbon atoms; m represents an integer of 1 to 50; and A groups which number m may be the same or different, and having a molecular weight of 10,000 to 100,000,000.

4. The stabilized dispersion magnetorheological fluid according to claim 3 wherein the dispersive medium is a hydrocarbon oil.

* * * * *